(12) United States Patent
Lecuelle

(10) Patent No.: US 9,299,165 B2
(45) Date of Patent: Mar. 29, 2016

(54) METHOD AND DEVICE FOR AUTOMATICALLY DETERMINING THE CONTOURS OF HEIGHTS OF THE RELIEF OF A GEOGRAPHICAL AREA

(75) Inventor: Jérémy Lecuelle, Paris (FR)

(73) Assignee: MBDA France, Paris (FR)

( * ) Notice: Subject to any disclaimer, the term of this patent is extended or adjusted under 35 U.S.C. 154(b) by 220 days.

(21) Appl. No.: 14/124,124

(22) PCT Filed: Jun. 5, 2012

(86) PCT No.: PCT/FR2012/000224
§ 371 (c)(1),
(2), (4) Date: Jan. 30, 2014

(87) PCT Pub. No.: WO2012/168572
PCT Pub. Date: Dec. 13, 2012

(65) Prior Publication Data
US 2014/0133708 A1    May 15, 2014

(30) Foreign Application Priority Data
Jun. 9, 2011  (FR) ...................................... 11 01771

(51) Int. Cl.
*G06K 9/00*     (2006.01)
*G06T 7/60*     (2006.01)
(Continued)

(52) U.S. Cl.
CPC .............. *G06T 7/602* (2013.01); *G06T 7/0081* (2013.01); *G06T 7/0083* (2013.01); *G06T 7/0091* (2013.01); *G06T 17/05* (2013.01); *G06T 2207/10028* (2013.01); *G06T 2207/10032* (2013.01); *G06T 2207/20036* (2013.01); *G06T 2207/20148* (2013.01); *G06T 2207/30181* (2013.01); *G06T 2207/30212* (2013.01)

(58) Field of Classification Search
None
See application file for complete search history.

(56) References Cited

U.S. PATENT DOCUMENTS 5,448,241 A * 9/1995 Zeoli et al. ................... 342/25 A
5,832,111 A * 11/1998 Florent ......................... 382/171
5,974,170 A * 10/1999 Louis et al. ................... 382/154
(Continued)

OTHER PUBLICATIONS

"Towards automatic building extraction from high-resolution digital elevation models," Weidner, U., et al, ISPRS Journal of Photogrammetry and Remote Sensing, vol. 50, No. 4 (Jan. 1, 1995), pp. 38-49.*
(Continued)

*Primary Examiner* — Wenpeng Chen
(74) *Attorney, Agent, or Firm* — Duane Morris LLP; J. Rodman Steele, Jr.; Gregory M. Lefkowitz

(57) ABSTRACT

A device for automatically determining the contours of heights of a relief includes an image receiving unit configured to receive an image of a predetermined geographical area. The image includes altimetric data. A background surface elimination unit eliminates the background surface of the relief. The background surface illustrates gradual variations in one or more altitudes of the geographical area. A top-hat algorithm having an adjustable structuring element can be used. A thresholding unit generates a binary image which only contains those reliefs having heights above a threshold value. An extracting unit extracts rough contours of heights of the relief from the binary image. A simplifying unit obtains a set of polygons by simplifying the rough contours. The polygons illustrate contours of the heights of the relief of the geographical area.

10 Claims, 4 Drawing Sheets

(51) Int. Cl.
*G06T 7/00* (2006.01)
*G06T 17/05* (2011.01)

(56) References Cited

U.S. PATENT DOCUMENTS

| | | | | |
|---|---|---|---|---|
| 6,104,408 | A | * | 8/2000 | Taupin et al. ............... 345/581 |
| 7,085,650 | B2 | * | 8/2006 | Anderson ....................... 702/2 |
| 2002/0147567 | A1 | * | 10/2002 | Rahmes et al. ............... 702/152 |
| 2003/0190081 | A1 | * | 10/2003 | Tsuboi et al. ............... 382/239 |
| 2007/0265781 | A1 | * | 11/2007 | Nemethy et al. ............... 702/5 |
| 2008/0008397 | A1 | * | 1/2008 | Kisilev ....................... 382/275 |
| 2008/0089558 | A1 | * | 4/2008 | Vadon et al. ............... 382/113 |
| 2013/0202197 | A1 | * | 8/2013 | Reeler et al. ............... 382/154 |
| 2014/0219541 | A1 | * | 8/2014 | Noyel et al. ............... 382/141 |

OTHER PUBLICATIONS

Weidner, U., et al. "Towards automatic building extraction from high-resolution digital elevation models" ISPRS Journal of Photogrammetry and Remote Sensing, vol. 50, No. 4 (Jan. 1, 1995), p. 38, pp. 38-49.

Baillard, C., et al., "Segmentation of urban scens from aerial stereo imagery", Pattern Recognition, 1998, Proceedings, Fourteenth International Confe Rence on Brisbane, QLD,• Australia Aug. 16-20, 1998,Los Alamitos, CA, USA,IEEE Comput. Soc., vol. 2, Aug. 16, 1998, pp. 1405-1407.

Neubeck, A. et al., "Efficient non-maximum suppression," 18th International Conference on Pattern Recognition IEEE Comput. Soc. Los Alamitos. CA. USA., 2006. p. 6.

* cited by examiner

METHOD AND DEVICE FOR AUTOMATICALLY DETERMINING THE CONTOURS OF HEIGHTS OF THE RELIEF OF A GEOGRAPHICAL AREA

CROSS-REFERENCE TO RELATED APPLICATIONS

This application is a §371 national stage entry of International Application No. PCT/FR2012/000224, filed Jun. 5, 2012, which claims priority to French Patent Application No. 1101771 filed Jun. 9, 2011, the entire contents of which are incorporated herein by reference.

The present invention relates to a method and a device for automatically determining the contours of heights of the relief of a geographical area, in particular terrestrial or submarine.

In the case of a military application, it is known that knowledge of the heights of the relief of a particular terrestrial area is, in particular, very useful for assisting the deployment of elements of ground-to-air defence weapons systems. These elements need to be placed in positions which allow them to benefit from the most extensive visibility possible, while avoiding masking created by the relief, in order to allow sensors to detect targets as early as possible and for the greatest possible distances, and to allow interception and neutralisation elements to take best advantage of their range.

Such heights of the relief may in particular be used when preparing ground-to-air defence missions around a sensitive site, making it possible to exploit the local heights while avoiding gradual variations in the altitude of the relief.

It will be noted that, for satisfactory implementation of such a method for determining the contours of the heights of the relief of a particular geographical area, this method must be capable of eliminating the gradual variations in gradient in all directions at once, and must also be usable by any type of element of the ground-to-air defence weapon system without requiring excessive modification.

Conventional solutions for solving this problem provide:
a) low-frequency filtering of the image of the altitudes (use of the Fourier transform of the image); or
b) classification applied to the images.

However, these conventional solutions have in particular the following respective drawbacks:
difficulty of obtaining the relevant heights owing to the difficulty of adjusting the parameters (cut-off frequency of the filter, thresholding of the altitudes, etc.), for solution a); and
no elimination of the gradual variations in altitude, for solution b). Classification methods are very useful for defining areas of different natures, such as forests, towns, roads, etc., but are a priori not adapted to the extraction of objects of the relief.

These conventional solutions are thus not satisfactory, in particular for the applications envisaged.

Furthermore, a method and a device for automatically determining the contour of valleys of a geographical area are known from EP 0 863 487.

The object of the present invention is to overcome the above-mentioned drawbacks. It relates to a method for automatically determining, in a rapid, simple and reliable manner and at reduced cost, the contours of the heights of a particular geographical area, irrespective of the gradual variations in altitude of the relief in all directions.

To this end, according to the invention said method is noteworthy in that the following successive operations are performed automatically:

a) on the basis of an image of said geographical area, which contains altimetric data of points therein, the background surface of the relief which illustrates the gradual variations in the altitudes of said geographical area is eliminated;
b) on the basis of the results of step a), thresholding is performed to form a binary image of the relief seen from above, containing only reliefs having heights above a threshold value;
c) from this binary image which comprises two different types of area, rough contours of the heights of the relief are extracted, illustrating the boundaries between these two different types of area; and
d) said rough contours are simplified so as to obtain a set of polygons illustrating said contours of the heights of the relief of said geographical area.

Thus, owing to the invention, it is possible to determine automatically, in a rapid, simple and reliable manner and at reduced cost, the contours of the heights of a determined geographical area. Moreover, this determination can be made irrespective of the gradual variations in altitude of the relief in all directions, in particular owing to the elimination of the background surface of the relief.

The method according to the invention thus makes it possible to extract, from a digitised image of said geographical area, this image preferably being from a conventional DTED (Digital Terrain Elevation Data) file, contours of the heights, and to present these contours in the form of a set of polygons, a polygon representing a closed geometric figure formed of a series of line segments. Such a representation in the form of a set of polygons can advantageously be used in the context of a military operation, in particular for positioning elements of a ground-to-air defence weapons system, or in the context of a civil operation.

As specified below, said automatic processing method uses what are known as adjustment parameters which can be adjusted, that is to say modified, by an operator. These adjustment parameters make it possible in particular to vary the dimensional features of the heights of the relief, extracted from the geographical area under consideration, and this means that the invention can be used for any type of terrestrial relief, and in particular for any type of ground elements to be deployed. The method according to the invention can also be used for any type of submarine relief (submarine operation) and for any type of non-terrestrial planetary relief (space exploration).

In a preferred embodiment, in step d) said set of polygons is superimposed consistently on an image of said geographical area so as to obtain a composite image, which can in particular be displayed or printed.

Furthermore, advantageously:
in step a), to eliminate the background surface of the relief, what is known as a "top hat" algorithm, comprising a structuring element which is adjustable, is used; and/or
the threshold value used in step b) is adjustable; and/or
in step d) a simplification algorithm is implemented which uses a tolerance parameter indicating the degree of simplification, which is also adjustable.

In a preferred embodiment, in an additional step, said set of polygons is analysed in order to define at least one, but preferably a plurality of attributes which make it possible to characterise said polygons. Preferably, each attribute thus determined is highlighted in said composite image, for example using a particular colour code, a characteristic sign or symbol and/or an alphanumeric value.

Advantageously, in said additional step, at least some of the following attributes, which are independent of the altitudes of the relief, are determined:

the distance from a target;
at least the area of a polygon;
at least a simple majorant rectangle which is associated with a polygon; and
at least a majorant convex polygon.

Furthermore, in a variant or in addition, at least some of the following attributes, which for their part are dependent on the altitudes of the relief, are also determined in said additional step:
the mean altitude;
the standard deviation of the altitudes;
the maximum altitude; and
high points.

Advantageously, to determine said high points, points having local maximum heights are sought, by means of a threshold which is adjustable, and all the points found which are outside said rough contours are excluded, as specified below.

The present invention also relates to a device for automatically determining (in a rapid, simple and reliable manner and at reduced cost) the contour of the heights of a particular geographical area.

To this end, according to the invention said device is noteworthy in that it comprises:
means for receiving an image of said geographical area, which contains altimetric data of points therein;
means for eliminating, on the basis of said image, the background surface of the relief which illustrates the gradual variations in the altitudes of said geographical area;
means for performing thresholding in order to form a binary image of the relief seen from above, containing only reliefs having heights above a threshold value;
means for extracting from this binary image, which comprises two different types of area, rough contours of the heights of the relief, illustrating the boundaries between the two different types of area;
means for simplifying said rough contours so as to obtain a set of polygons illustrating the contours of the heights of the relief of said geographical area; and
means for transmitting said set of polygons to user means, for example display or printing means.

Said device can be used for any type of relief, whether terrestrial or submarine. It thus provides for elimination of the background surface of the relief which contains the gradual variations in the altitudes. The thresholding of the altitudes modified in this way thus makes it possible to generate a binary image of the heights which will be then used to extract the contours.

In a particular embodiment, said device also comprises:
means for analysing said set of polygons with the aim of defining at least one attribute making it possible to characterise said polygons;
means allowing an operator to enter data, and in particular said adjustment parameters; and/or
said user means.

The figures of the appended drawings will facilitate understanding of how the invention can be implemented. In these figures, identical references designate similar elements.

Figure 1:
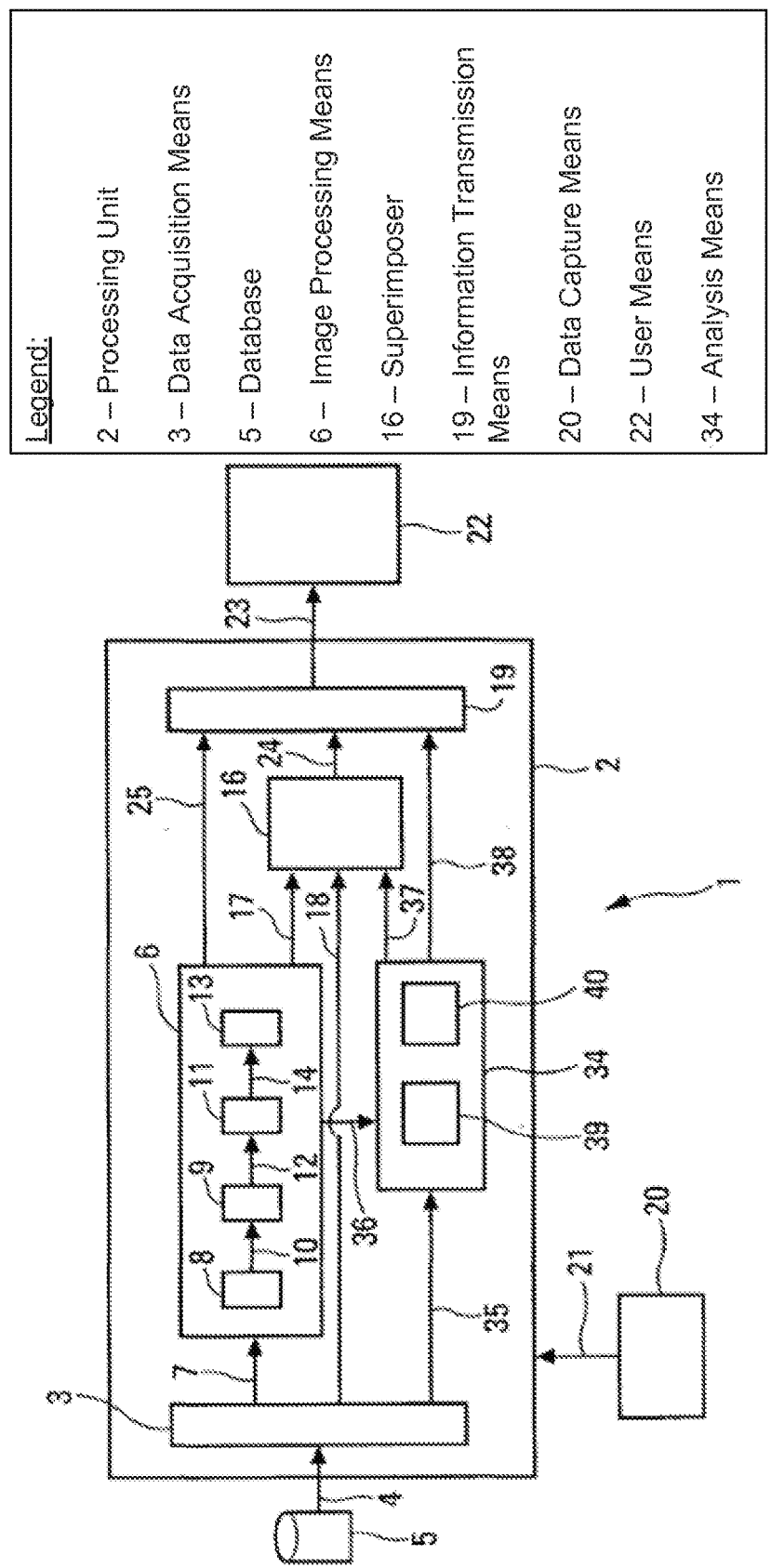
FIG. 1 is a block diagram of a device according to the invention.

The device 1 according to the invention and represented schematically in FIG. 1 is suitable for determining the contours of the heights of a particular geographical area, irrespective of the gradual variations of altitude of the relief in all directions.

For this purpose, said device 1 comprises, according to the invention, a processing unit 2 which comprises:
data acquisition means 3, for receiving an image of the geographical area ZO to be analysed. This image, which is a digitised image and contains altimetric data of points in said geographical area ZO, is received (via a data transmission link 4) from a file, preferably a DTED (Digital Terrain Elevation Data) file, which is stored in a conventional database 5; and
image processing means 6, which are connected to said means 3 by a link 7.

According to the invention, said means 6 comprise:
means 8 for eliminating, on the basis of said image received from the means 3, the background surface of the relief which illustrates the gradual variations in the altitudes of said geographical area;
means 9 which are connected via a link 10 to said means 8 and which are formed to perform thresholding in order to form a binary image IB of the relief seen from above (FIG. 3), containing only reliefs having heights above a threshold value;
means 11 which are connected via a link 12 to said means 9 and which are formed to extract from this binary image IB (comprising two different area types Z1 and Z2) rough contours of the heights of the relief. These rough contours illustrate the boundaries between the two different area types Z1 and Z2; and
means 13 which are connected via a link 14 to said means 11 and which are formed to simplify said rough contours in order to obtain a set of polygons which illustrate the (sought) contours of the heights of the relief of said geographical area.

In addition, said processing unit 2 further comprises means 16 which are for example connected via links 17 and 18 to said means 6 and 3 respectively and which are formed to superimpose said set of polygons (received from the means 6) on an image of said geographical area (received from the means 3), for example a photo taken by a satellite. This superimposition is performed consistently, that is to say that information relating to the same coordinates in the plane of the image is superimposed each time. What is known as a composite (or hybrid) image IF is thus obtained, such as that shown for example in FIG. 6, which can be transmitted via information transmission means 19.

In addition, said device 1 further comprises:
means 20, for example a keyboard or any other data capture means, which are for example connected via a link 21 to said processing unit 2 and which allow an operator to enter data into said processing unit 2, and in particular adjustment parameters, as defined below; and
user means 22, in particular (display or printing) means which make it possible to present to an operator the results of the processing implemented by the processing unit 2 (and received via a link 23 from said means 19). Said means 19 of the unit 2 are connected via links 24 and 25 to said means 16 and 6 respectively.

Thus, the device 1 according to the invention is capable of automatically determining, in a rapid, simple and reliable manner and at reduced cost, the contours Ci of the heights of a determined geographical area ZO. Furthermore, this determination can be made irrespective of the gradual variations in altitude of the relief in all directions, in particular owing to the suppression of the background surface of the relief, implemented by the means 8.

Said device 1 thus makes it possible to extract contours Ci of the heights from a digitised image of said geographical area, this image being preferably from a conventional DTED (Digital Terrain Elevation Data) file, and to present these contours Ci in the form of a set of polygons Pi. In a conventional manner, a polygon Pi represents a closed geometric figure, formed of a series of line segments. Such a representation in the form of a set of polygons can be used in the context of a military operation, in particular for positioning elements of a ground-to-air defence weapons system, or in the context of a civil operation.

As specified below, said device 1 uses adjustment parameters which can be adjusted, that is to say modified, by an operator using the means 20, and which make it possible to vary the dimensional features of the heights of the relief extracted from the geographical area under consideration, and this means that the invention can be used for any type of terrestrial relief, and in particular for any type of ground element to be deployed. The device 1 according to the invention can also be used for any type of submarine relief (submarine operation) and for any type of non-terrestrial planetary relief (space exploration).

The purpose of said means 8 is thus to eliminate the background surface of the relief, that is to say the very gradual variations in altitude over large distances (such as for a gentle slope or a false level) as opposed to significant variations in altitude corresponding to the reliefs having contours which are to be extracted, namely reliefs (such as hillocks and hills) which may in particular be exploited for the deployment of elements of a defence weapons system.

For this purpose, said means 8 use a suitable conventional "top hat" algorithm using a structuring element which is adjustable (using the means 20).

In a conventional manner, this algorithm uses a sphere (or ball) as a structuring element, and is expressed mathematically as follows:

$f-O(f,g)$, f being the image of the rough relief, g the structuring element and O the morphological opening operator.

The radius of the sphere, typically of approximately 2500 m, is an adjustment parameter which can be used to adjust the result.

The background surface is preferably eliminated by means of a particular algorithm, known as a "rolling ball" algorithm, which is an algorithm for processing images in the field of mathematical morphology.

Figure 2:
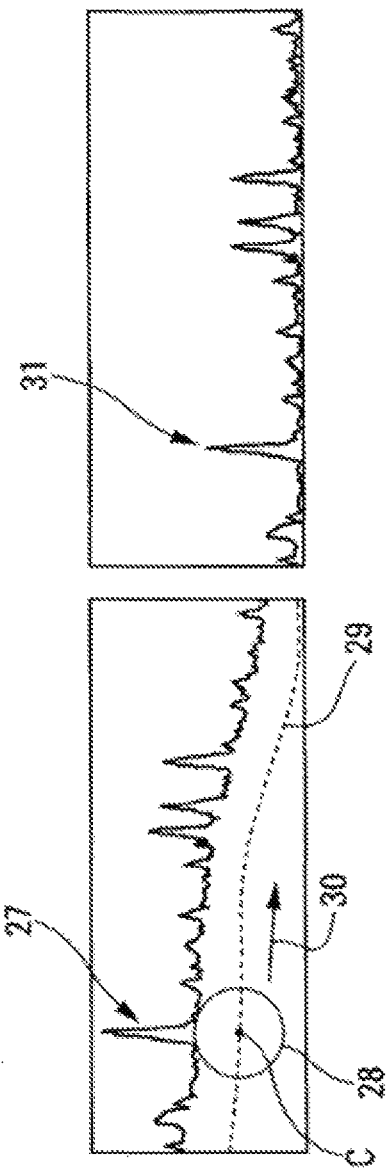
FIGS. 2A and 2B show schematically vertical profiles to illustrate the elimination of a background surface.

This step is implemented by rolling, under the rough relief 27, a ball 28 having a radius just greater than the radius of curvature of the reliefs which are to be extracted, as shown in FIG. 2A (which is simplified to a vertical profile). The field 29 (shown by a broken line in FIG. 2A) formed of the points covered by the centre C of the ball 28 during displacement thereof (illustrated by an arrow 30) is thus constructed. The altitudes of this field 29, increased by the radius of the ball, are then subtracted from the altitudes of the rough relief, so as to obtain the relief 31 shown in FIG. 2B.

Figure 3:
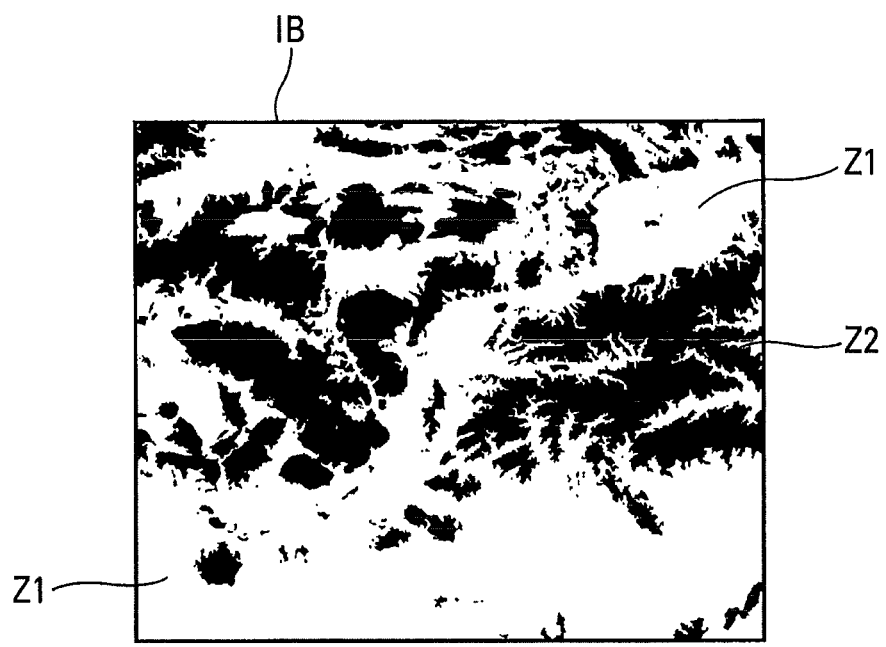
FIG. 3 shows schematically a binary image obtained after a thresholding step.

The elimination of the background makes it possible to redefine the altitudes in relation to the background surface. The heights can thus be extracted by thresholding of the image. The purpose of the means 9 is to perform the thresholding of the altitudes of the obtained relief 31, so as to preserve only the reliefs which are high enough to be exploited, in particular for the deployment of elements of a defence system. The threshold value used (for example of approximately 50 m) can be adjusted (or parameterised) by an operator using the means 20. Owing to the processing implemented by said means 9, a (black and white) binary image IB of the relief seen from above, as shown in FIG. 3, is obtained.

From this binary image IB, said means 11 extract the contours of the heights of the relief highlighted in the preceding step (boundaries between the white portions Z1 and the black portions Z2 (representing the extracted reliefs) of the binary image IB), which are then simplified by said means 13 in order to obtain a representation of the contours of these heights in the form of a set of polygons.

The rough contours obtained following the extraction implemented by the means 11 are in four-connexity.

In order to obtain contours which are easy to exploit and display, the means 13 simplify them to reduce the number of points which constitute them. The simplification algorithm used is preferably the known Douglas-Peucker algorithm, which takes into account a tolerance parameter. This tolerance parameter, which can be adjusted by an operator (using the means 20), makes it possible to adjust the degree of simplification, since it indicates the maximum deviation tolerated between the original contour and the simplified contour.

Furthermore, in a preferred embodiment, said processing unit 2 further comprises means 34 (which are connected via links 35, 36, 37 and 38 to said means 3, 6, 16 and 19 respectively) for analysing said set of polygons with the aim of defining at least one attribute making it possible to characterise said polygons.

After the extraction (performed by the means 6), the only information available on the heights is their contour. The characterisation implemented by the means 34 is intended to define attributes (other than the contour) which can be used to describe the heights and the contours obtained. They can be sorted into two categories:
 the attributes which are independent of the altitudes, which describe the form of the height: convex envelope, majorant rectangle, etc.; and
 the attributes for describing the altitudes of the height: mean altitude, variance of the altitudes, high points, etc. In this case, the contours of the heights (determined on the basis of the image of the modified altitudes) must be transferred to the image of the actual heights, in order to carry out the different measurements.

Preferably, each attribute thus determined is highlighted in said composite image IF, for example using a particular colour code, a characteristic sign or symbol and/or an alphanumeric value.

By way of illustration, said means 34 comprise means 39 which can take into account, as attributes independent of the altitudes:

A/ the distance which makes it possible to distinguish the heights according to their distance from a particular target. In the case of deployment, this makes it possible to distinguish the heights which could receive weapons systems, those which will not receive weapons systems but are to be taken into account because they may hinder defence, and those which are not to be taken into account. These three categories can be characterised in the following manner: close (up to 8 km for example), distant (up to 20 km for example) and very distant (more than 20 km);

B/ the area, that is to say the surface area of the height calculated on the basis of the rough contour (before simplification);

C/ the type of heights. The heights can be sorted into different categories, for example into four categories, according to their surface area. By way of illustration, the categories, from the least extensive to the most extensive, may be: hillocks (up to 1 km$^2$), hills (up to 9 km$^2$), mountains (up to 400 km$^2$) and mountain ranges;

D/ a simple majorant rectangle which designates the smallest rectangle, the sides of which are parallel to the abscissa axis or to the ordinate axis, and which surrounds a polygon; and E/ a majorant convex polygon which designates the convex envelope of the contour of the height.

In addition, said means 34 also comprise means 40 which can take into account, as attributes dependent on the altitudes:
the mean altitude;
the standard deviation of the altitudes;
the maximum altitude; and
high points.

To determine high points, said means 40 search for points having local maximum heights, using a threshold which is adjustable, and then they exclude the points which are outside the rough contours.

It will be noted that, to give a weapons system the best visibility, it must be placed on a peak within a height. Also, in order to obtain complete information, it is assumed that a height may contain a plurality of high points (or peaks) which then correspond to the local altitude maxima.

The function of searching for local extrema makes it possible to extract the position of the local maxima from a greyscale image. This function uses the conventional parameter known as noise tolerance, which makes it possible to filter the local extrema to retain only those which are significant. This parameter makes it possible to define the threshold which will be applied to the altitudes, using the following formula:

$$S = z_{max} - T$$

in which:
$z_{max}$ represents the altitude of the local maximum under consideration; and
T represents said noise tolerance parameter.

Figure 4:
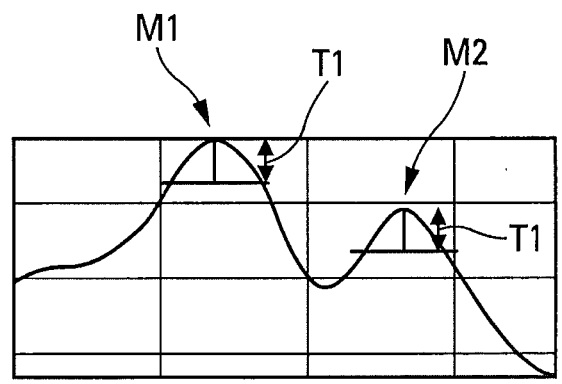
FIGS. 4 and 5 show schematically two graphs to explain the features of a parameter which is used to determine high points.
Figure 5:
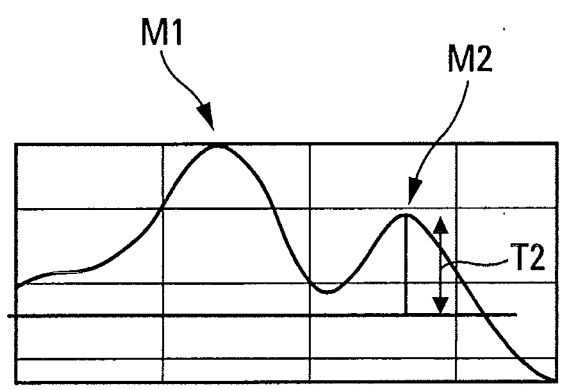

So, the continuous area around the local maximum having altitudes above this threshold is considered. The maximum is then retained if it represents an overall maximum over this continuous area. Thus, by way of illustration:
in the example in FIG. 4, in the case of a low value T1 for T, the two maxima M1 and M2 are retained; whereas
in the example in FIG. 5, the parameter T has a higher value T2. The continuous area defined below the second maximum M2 contains the first extremum M1 having a higher altitude. The second maximum M2 will thus not be retained.

To adjust this parameter T, the standard deviation of the altitudes is used, which takes into account the range of the altitudes present over the height, while being insensitive to extreme values. Over heights of small area which have a low variation in altitude, the less significant local maxima are retained, whereas over a very extensive height which contains very different altitudes (for example a group of mountains) only the very significant local maxima are retained. The definition of the parameter T which is retained is thus as follows:

$$T = k \cdot \sigma$$

in which:
k represents the coefficient of standard deviation defined by an operator (close to 1); and
σ represents the standard deviation of the altitudes (in m).

The adjustment of said coefficient k makes it possible to adjust the condition for taking into account high points. A low value will mean that numerous high points are accepted. Conversely, a high value will make the condition for taking into account the high points stricter, and this will result in a lower number of high points.

Furthermore, the last step implemented by said means 40 consists of keeping only the high points (found in this manner) which are inside the simplified contours. The search for the high points is carried out on the basis of the rough contour (before simplification). Therefore, in some situations, high points are outside the contour after simplification. It is thus appropriate to exclude them.

The high points can be highlighted in an image IF via triangles indicating their geographical location, with which values indicating the corresponding altitudes are associated.

Figure 6:
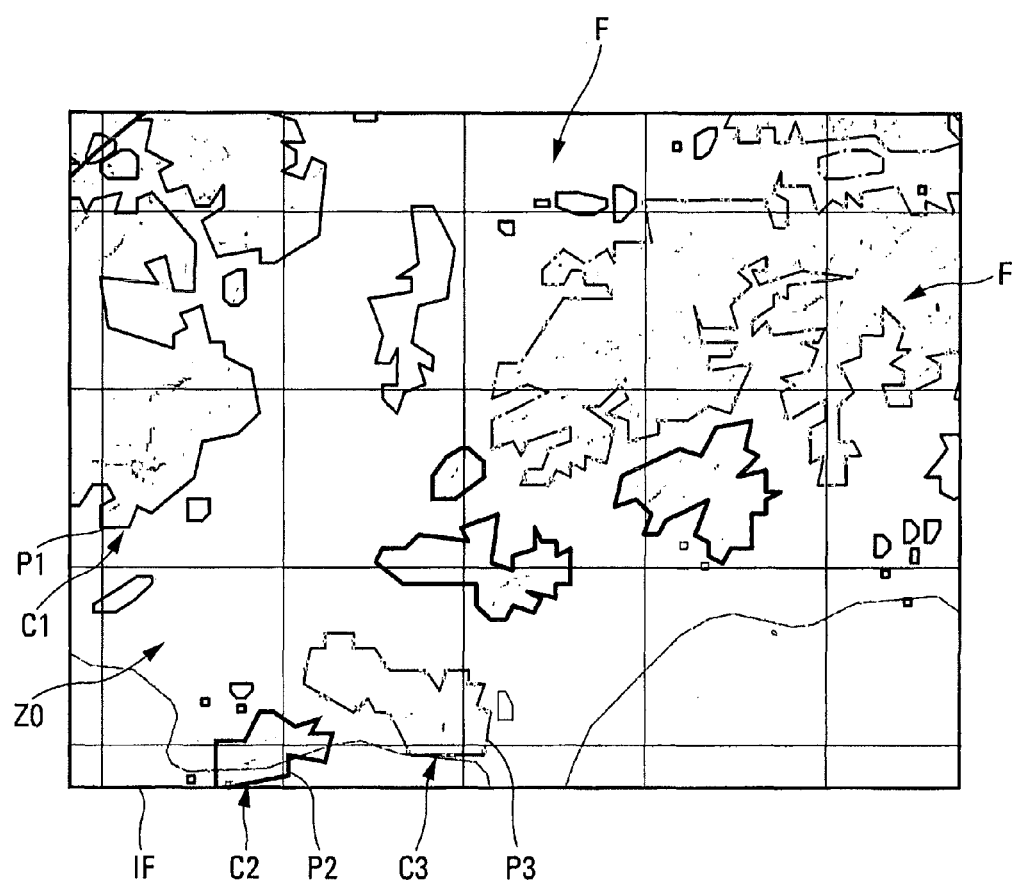
FIG. 6 shows schematically a composite image which can be obtained by means of a device according to the invention.

FIG. 6 shows a composite image IF comprising a background F illustrating an image (for example a satellite image), on which the contours, that is to say the set of polygons Pi obtained owing to the invention, have been superimposed.

In FIG. 6, some attributes which make it possible to provide information on the contours have been highlighted. Thus, by way of illustration:
contours C1 which are distant have been shown in the form of polygons P1 having a medium continuous line; and
contours C2 and C3 having different categories (regarding their surface) have been shown in the form of polygons P2 and P3 having thick continuous lines and dot-dash lines respectively.

The invention claimed is:

1. A method for automatically determining contours of heights of a relief, of a geographical area (ZO), the method comprising:
a) on the basis of an image of said geographical area (ZO), which contains altimetric data of points therein, a background surface of the relief which illustrates gradual variations in altitudes of said geographical area (ZO) is eliminated, by implementing a top hat algorithm, which uses a structuring element (28) which is adjustable;
b) on the basis of step a), thresholding is performed on the image of said geographical area (ZO) to form a binary image (IB) of the relief seen from above, containing only reliefs having heights above a threshold value which is adjustable, wherein the threshold value is calculated using a noise tolerance parameter wherein T=k−σ, wherein k is a coefficient of standard deviation and σ is the standard deviation of altitudes in the altimetric data;
c) from this binary image (IB) which comprises two different types (Z1, Z2) of area, rough contours of the heights of the relief are extracted, illustrating the boundaries between these two different types (Z1, Z2) of area; and
d) said rough contours are simplified so as to obtain a set of polygons (P1, P2, P3) illustrating the contours (C1, C2, C3) of the heights of the relief of said geographical area (Z0).

2. The method according to claim 1, wherein in step d) said set of polygons (Pi, P2, P3) is superimposed consistently on an image (F) of said geographical area (ZO) so as to obtain a composite image (IF).

3. The method according to claim 1, wherein in step sphere is used as a structuring element.

4. The method according to claim 1, wherein in step b) the thresholding is performed so as to preserve only one or more reliefs which are high enough to be exploited.

5. The method according to claim 1, wherein in step d) simplification algorithm is implemented which uses a tolerance parameter indicating a degree of simplification, which is adjustable.

6. The method according to claim 1, wherein, in an additional step, said set of polygons (P1, P2, P3) is analysed in order to define at least one attribute making it possible to characterise said polygons (P1, P2, P3).

7. The method according to claim 1, wherein said attribute is highlighted in a composite image (IF).

8. The method according to claim 1, wherein at least some of the following attributes, which are independent of one or more altitudes of the relief, are determined:
- a distance from a target;
- at least an area of a polygon;
- at least a simple majorant rectangle which is associated with a polygon; and
- at least a majorant convex polygon.

9. The method according to claim 1, wherein at least some of the following attributes, which are dependent on one or more altitudes of the relief, are determined:
- a mean altitude;
- a standard deviation of the altitudes;
- a maximum altitude; and
- high points.

10. The method according to claim 9, wherein, to determine said high points, points having local maximum heights (M1, and M2) are sought, by means of a threshold which is adjustable, and all the points found which are outside said rough contours are excluded.

* * * * *